United States Patent
Jajtic

(10) Patent No.: US 7,915,769 B2
(45) Date of Patent: Mar. 29, 2011

(54) PRIMARY PART AND LINEAR ELECTRICAL MACHINE WITH FORCE RIPPLE COMPENSATION

(75) Inventor: Zeljko Jajtic, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/366,890

(22) Filed: Feb. 6, 2009

(65) Prior Publication Data

US 2009/0206682 A1    Aug. 20, 2009

(30) Foreign Application Priority Data

Feb. 18, 2008    (EP) .................................... 08002960

(51) Int. Cl.
*H02K 41/02*    (2006.01)
(52) U.S. Cl. .................................................. 310/12.24
(58) Field of Classification Search ............... 310/12.01, 310/12.18, 12.22, 12.24, 12.25, 181
See application file for complete search history.

(56) References Cited

U.S. PATENT DOCUMENTS

| | | | | |
|---|---|---|---|---|
| 2003/0098620 A1* | 5/2003 | Ohto et al. | ...................... | 310/12 |
| 2007/0222304 A1* | 9/2007 | Jajtic et al. | ...................... | 310/12 |

FOREIGN PATENT DOCUMENTS

| | | |
|---|---|---|
| DE | 198 29 052 C1 | 12/1999 |
| DE | 10 2005 004 380 A1 | 8/2006 |
| DE | 10 2006 013 582 A1 | 9/2007 |
| DE | 10 2006 035 671 A1 | 2/2008 |
| WO | WO 2006032255 A | 3/2006 |
| WO | WO 2008/015140 A1 | 2/2008 |

* cited by examiner

*Primary Examiner* — Hanh N Nguyen
(74) *Attorney, Agent, or Firm* — Henry M. Feiereisen; Ursula B. Day

(57) ABSTRACT

A primary part of a linear electrical machine includes a first member for production of a first magnetic field, a second member for production of a second magnetic field. The first member and the second member are arranged to realize a superimposition of the first magnetic field with the second magnetic field. Arranged on at least one end face of the primary part is a flux-guiding element to reduce a force ripple. The flux-guiding element is constructed in the form of an end tooth module having at least one permanent magnet.

18 Claims, 2 Drawing Sheets

PRIMARY PART AND LINEAR ELECTRICAL MACHINE WITH FORCE RIPPLE COMPENSATION

CROSS-REFERENCES TO RELATED APPLICATIONS

This application claims the priority of European Patent Application, Serial No. 08002960, filed Feb. 18, 2008, pursuant to 35 U.S.C. 119(a)-(d), the content of which is incorporated herein by reference in its entirety as if fully set forth herein.

BACKGROUND OF THE INVENTION

The present invention relates to a primary part of a linear electrical machine, and to a linear electrical machine with a primary part.

Nothing in the following discussion of the state of the art is to be construed as an admission of prior art.

Linear electrical machines have a primary part and a secondary part which are arranged in opposite relationship and separated from one another by an air gap. The primary part is intended for electric current to be passed through it. It is possible for both the primary part and the secondary part to have active means for production of magnetic fields. For example, the primary part has a winding through which current can be passed, and the secondary part has permanent magnets. In addition, it is also possible for the primary part to have a plurality of active means for production of magnetic fields, and for the secondary part to be free of such means.

German patent document DE 10 2004 045 992 A1 discloses an electrical machine with a primary part which has all the magnetic sources of the electrical machine. The primary part has, for example, a winding through which current can be passed and permanent magnets whereas the secondary part is, for example, only in the form of a toothed iron reaction rail.

Unlike electrical machines which operate by rotation, linear electrical machines have end areas in which the electromagnetic part of the machine ends. If, for example, a linear motor is designed using a short stator construction, i.e. a primary part is sized shorter than a secondary part, the primary part has two end areas which are located in the influence area of the secondary part. The ends of the primary part interact with the secondary part such that it has a significant influence on the active force ripple and the passive force ripple, also referred to as the cogging force. Parasitic cogging forces which occur as a result of the magnetic interaction between the primary part and the secondary part are referred to as passive force ripple. This results in vibration, rough running and drag errors during machining processes.

Furthermore, the induced voltages, i.e. the electromotive forces (EMF), in the initial and end coils at the end faces of the primary part are generally less pronounced than in the central coils in view of an absent magnetic return path. As a consequence, the electrical machine does not have a symmetrical induced voltage and an additional current-dependent force ripple, which is referred to as active force ripple is experienced in addition to reductions in the force.

German patent document DE 10 2005 004380 A1 discloses a linear motor with force ripple compensation by using a force ripple compensation tooth of a predefined width, which is separated by an additional air gap from the normal air gap and is at a different distance from the adjacent teeth of the laminated core as the remaining teeth of the laminated core.

It would therefore be desirable and advantageous to address prior art shortcomings.

SUMMARY OF THE INVENTION

According to one aspect of the present invention, a primary part of a linear electrical machine includes a first member for production of a first magnetic field, a second member for production of a second magnetic field, wherein the first member and the second member are arranged to realize a superimposition of the first magnetic field with the second magnetic field, and a flux-guiding element arranged on at least one end face of the primary part to reduce a force ripple, with the flux-guiding element being constructed in the form of an end tooth module having at least one permanent magnet.

Currently preferred is the arrangement of a flux-guiding element on each of the two end faces of the primary part. Suitably, the flux-guiding element is designed for production of a magnetic field and may include a member in correspondence to the first or the second member for production of a magnetic field of the primary part.

The fitting of flux-guiding elements makes it possible to reduce the active and, in particular, the passive force ripple, that is to say the cogging force. The induced voltages in the end teeth, to which windings are fitted, of the primary part are raised, with the aim of this being to ensure that the EMF of the winding of the primary part is as uniform as possible.

According to another advantageous feature of the present invention, the first member for production of a first magnetic field may be realized in the form of a single-phase or polyphase winding. In particular, the primary part may have a three-phase winding in the form of tooth-wound coils for connection to a three-phase power supply system. The second member for production of a second magnetic field may be formed from permanent-magnet material, in particular in the form of integral permanent magnets or multi-part permanent magnets.

According to another advantageous feature of the present invention, the primary part can be formed by a predefined number of tooth modules, wherein each tooth module has at least one permanent magnet and one tooth-wound coil. A primary part can be constructed in a modular form by means of individual tooth modules, depending on the desired type and length. The desired number of tooth modules is joined together as appropriate, for example by brackets. Each tooth module is, in particular, formed by electrical laminates as a laminated core, in order to reduce eddy currents in the primary part.

According to another advantageous feature of the present invention, the flux-guiding element may be constructed in the form of an end tooth module on the end faces of the primary part and have at least one permanent magnet. In terms of its type, the end tooth module corresponds to the other tooth modules of the primary part. It differs only in that no windings are fitted to it, i.e. it has no tooth-wound coil.

The present invention thus resolves prior art shortcomings by providing at least one, currently preferred two additional tooth modules at both ends of the primary part, the end tooth modules. These end tooth modules have the same basic geometry as the tooth modules which support the winding or coil of the primary part, and they are arranged as a continuation of the active primary part area at both ends.

The geometry and/or magnetization of the permanent-magnet material or of the permanent magnet in the end tooth module is critical for compensation in particular for the cogging forces.

According to another advantageous feature of the present invention, the permanent magnets of the primary part may have a predeterminable magnetization and a magnetic field strength, wherein the permanent magnets of the tooth modules and the permanent magnets of the end tooth modules have a same magnetization. Compared to a tooth module, the end tooth module may have a permanent magnet of smaller volume. As a result the permanent magnet in the end tooth module is smaller, and less permanent-magnet material is arranged in the end tooth module. For example, the permanent magnet in the end tooth module is reduced in size by a factor of 2 to 4 in comparison to a permanent magnet in the tooth module, thus making it possible to optimally reduce the cogging force. The extent of the reduction in size of the permanent magnet in the end tooth module is dependent inter alia on a track width of a linear motor.

According to another advantageous feature of the present invention, the permanent magnets of the primary part may have a predeterminable magnetization, wherein the permanent magnets of the tooth modules have a higher magnetization than the permanent magnets in the end tooth modules. Thus, the permanent magnets in the tooth modules and end tooth modules have a same geometric size and a same volume, but their magnetization differs. In other words, the magnetic material incorporated in the end tooth modules differs from that in the tooth modules. Examples of magnetic materials include neodymium-iron-boron magnets, samarium-cobalt magnets or ferrite magnets. These different magnetic materials have different magnetizations which are characterized, for example, by the magnetic characteristic values such as remanent induction or coercivity field strength. For example, a remanent induction reduced to about 25% results in an electrical machine cogging force reduced by a factor of 4-5 in comparison to the cogging force of a machine without modified end tooth modules.

The invention is applicable in particular to polyphase linear motors with permanent-magnet excitation in the primary part and with a passive secondary part, for example in the form of a toothed iron structure. As in the case of all linear motors and linear electrical machines, electromagnetic discontinuities result in a cogging force, which interferes with motor operation, at both primary part ends.

According to another aspect of the present invention, a linear electrical machine includes a primary part including a first member for production of a first magnetic field, a second member for production of a second magnetic field, wherein the first member and the second member are arranged to realize a superimposition of the first magnetic field with the second magnetic field, and a flux-guiding element arranged on at least one end face of the primary part to reduce a force ripple, with the flux-guiding element being constructed in the form of an end tooth module having at least one permanent magnet, and a secondary part constructed absent a production of a magnetic field.

According to another advantageous feature of the present invention, the secondary part may be implemented in the form of a toothed iron reaction part with a plurality of teeth and slots. The secondary part may be advantageously laminated, i.e. it is formed by a multiplicity of individual electrical laminates, in order to avoid eddy-current loses. Alternatively, however, the secondary part may also be formed by a solid, toothed iron reaction rail. The linear electrical machine is, in particular, a synchronous linear motor.

An electrical machine designed such as this has the advantage that the secondary part of the electrical machine has no active member for production of a magnetic field. The secondary part is only constructed for guidance of magnetic fields, and is therefore simple and costs little to manufacture.

The use of end tooth modules which have a modified permanent magnet material in comparison to the other tooth modules to reduce the cogging force results in a number of advantages:
better characteristics of the electrical machine, in particular of a linear motor, during operation, such as better synchronism, a greater rated force, higher drive dynamics and no "ghost movement" of the switched-off motor resulting from cogging force;
better characteristics in a drive system (for example the Siemens Sinamics drive system), for example more accurate pole position identification as a result of reduced electromagnetic asymmetries (end effects) of the linear motor.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
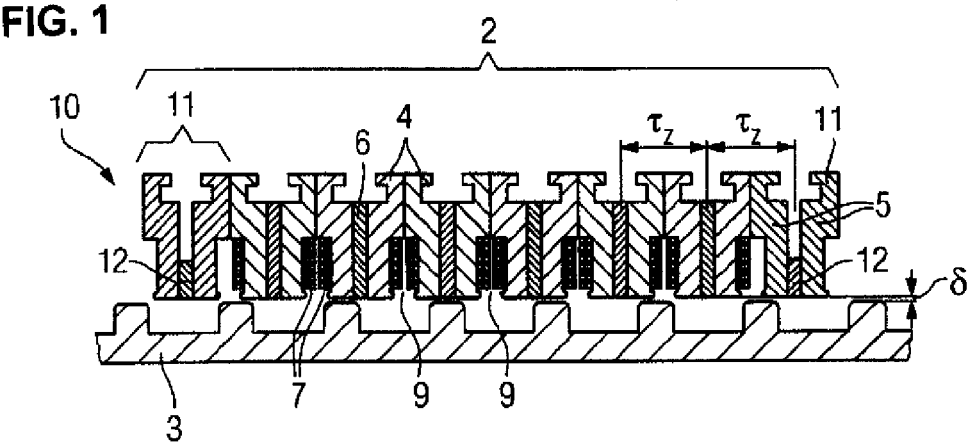
FIG. 1 shows a sectional view of a first embodiment of a linear electrical machine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a first embodiment of a linear electrical machine according to the present invention, generally designated by reference numeral 10. The linear electrical machine 10 includes a primary part 2 and a secondary part 3. The primary part 2 includes six tooth modules 4 and two end tooth modules 11 arranged on each end face of the primary part 2. Each tooth module 4 is formed by a laminated iron core 5 and has a permanent magnet 6 which is integrated in the tooth module 4. Of course, the permanent magnet 6 may also be arranged outside the tooth module 4 on the tooth module 4 on the side of the primary part 2 facing the air gap δ. By way of example, a permanent magnet 6 has the remanent induction $B_R$=1.2 T. Furthermore, each tooth module 4 has a tooth-wound coil 7, wherein the six tooth-wound coils 7 form the winding of the primary part 2. The winding has three phases, with the phases u, v, w, in such a way that two tooth-wound coils 7 are formed for each phase u, v, w. The tooth-wound coils 7 are located in the slots 9 in the primary part 2.

Each end tooth module 11 does not have a tooth-wound coil and has a permanent magnet 12 which is modified in comparison to the permanent magnet 6. All the permanent magnets 6 and 12 are formed from the same magnetic material and, for example, have a remanent induction $B_R$=1.2 T. However, the permanent magnet 12 has a smaller volume than the permanent magnet 6, that is to say it is smaller, in order to optimally reduce the cogging force. For a specific linear motor design, the motor cogging force can be very greatly reduced (for example by a factor of 5), for example by reducing the height of the permanent magnet 12 to about 40% of the normal height of the permanent magnets 6. The permanent magnets 12 are likewise arranged flush with the lower edge of the respective end tooth module 11, in the same way as the permanent magnets 6 in the other tooth modules 4. All the permanent magnets 6 and 12 are at the same distance from the air gap δ.

The tooth modules 4 and the end tooth modules 11 are physically identical, apart from this. The end tooth modules 11, when compared to the tooth modules 4, have the same slot pitch $\tau_z$ as that of the tooth modules 4.

Figure 2:
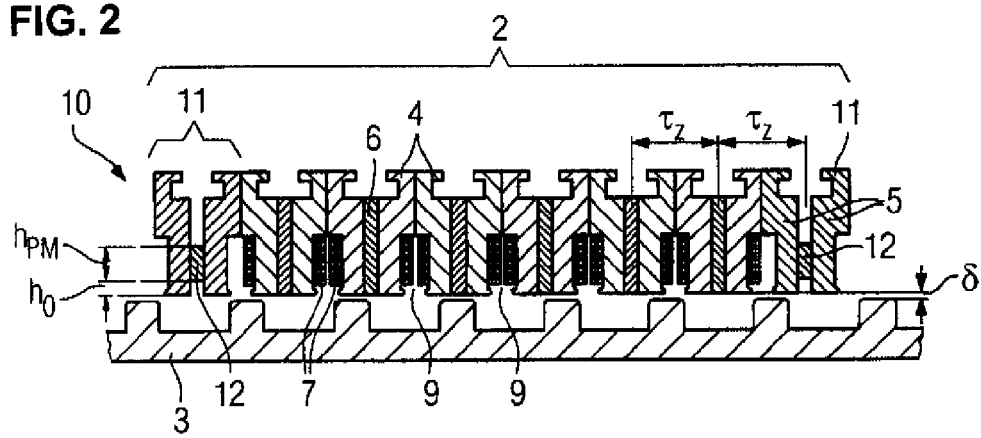
FIG. 2 shows a sectional view of a second embodiment of a linear electrical machine according to the present invention.

FIG. 2 shows a second embodiment of a linear electrical machine 10 in accordance with the present invention. The design of the electrical machine 10 corresponds essentially to that of the machine 10 shown in FIG. 2. The permanent magnets 6 and 12 are formed from the same magnetic material, but the permanent magnets 12 in the end tooth modules 11 have a smaller volume, that is to say they are smaller.

In comparison to the illustration shown in FIG. 2, however, the permanent magnets 12 do not end flush with the lower edge of the end tooth modules 11, but are arranged offset. In particular, the permanent magnets 12 are withdrawn into the end tooth modules 11. They are arranged offset upwards, that is to say away from the air gap δ.

The permanent magnets 12 have the height $h_{PM}$ and are offset by the height $h_0$. In particular, the following applies for $h_0$: $0 \leq h_0 \leq 10\delta$, thus making it possible to finely adjust the force ripple compensation effect. Permanent magnets 12 with the same geometric dimensions, in particular the same height $h_{PM}$ can thus be used for different physical sizes of linear motors or else for different track widths of linear motors, and the force ripple compensation effect can be appropriately adapted by respective adaptation of the height $h_0$.

Figure 3:
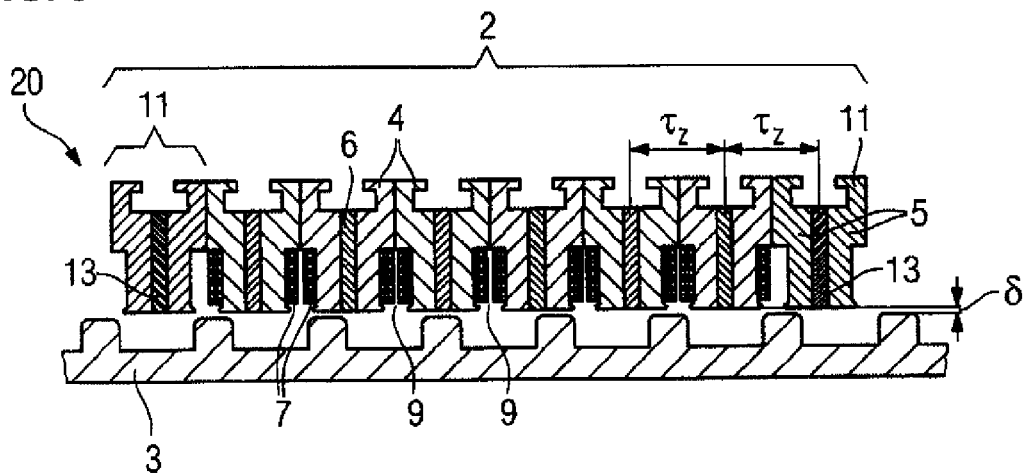
FIG. 3 shows a sectional view of a third embodiment of a linear electrical machine according to the present invention.

FIG. 3 shows a third embodiment of a linear electrical machine according to the invention, generally designated by reference numeral 20. The primary part 2 has the two additional end tooth modules 11 in addition to the six tooth modules 4, with one end tooth module 11 being arranged on each end face of the primary part 2. Each end tooth module 11 has a permanent magnet 13 which is modified in comparison to the permanent magnet 6, but has no tooth-wound coil. The permanent magnets 6 and 13 have the same geometric dimensions, but different magnetizations. For example, the permanent magnets 6 have a remanent induction $B_R$=1.2 T, while in contrast the permanent magnets 13 have a remanent induction $B_R$=0.3 T. A remanent induction $B_R$ such as this reduced to about 25% results in a cogging force of the linear electrical machine 20 being reduced by a factor of 4-5 in comparison to the cogging force of the machine 1 as shown in FIG. 1 without end tooth modules.

Figure 4:
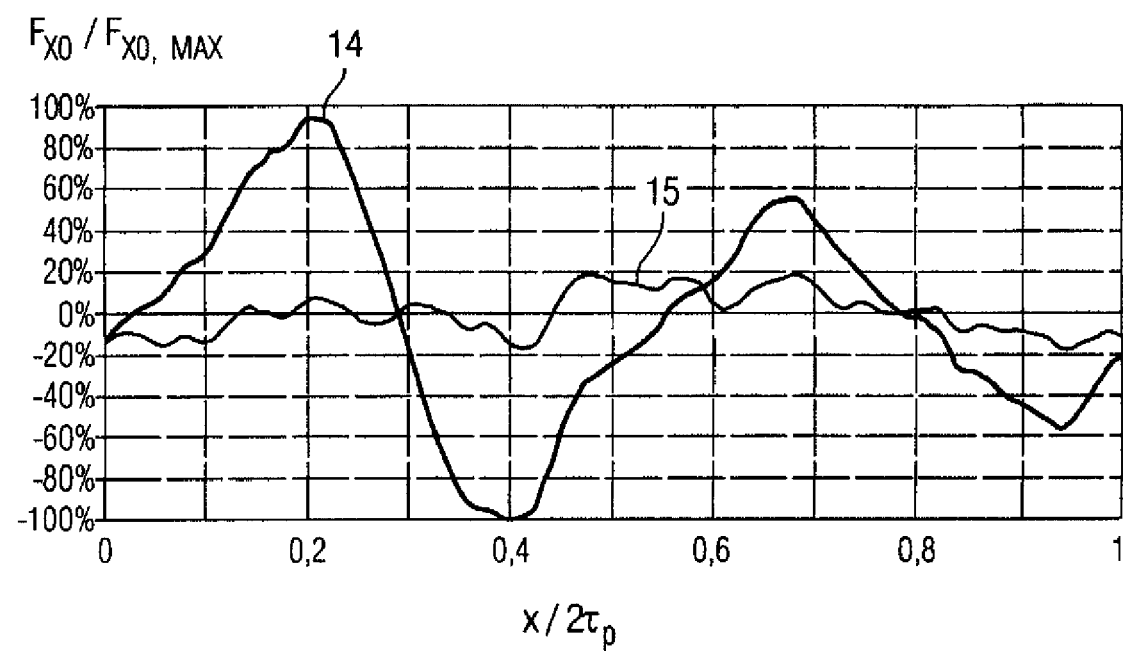
FIG. 4 shows a graphical illustration of the cogging force profile for various linear electrical machines.

FIG. 4 shows an illustration of the cogging-force profile of various electrical machines. The reference symbol 14 denotes the amplitude of the cogging force of an electrical machine 1 as shown in FIG. 1, that is to say of a machine without flux-guiding elements for reducing the force ripple. The reference symbol 15, in contrast, denotes the amplitude of the cogging force of an electrical machine 10 as shown in FIG. 2 with end tooth modules 11. FIG. 4 shows well that only very minor cogging forces occur when corresponding elements are arranged to reduce the cogging force.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A primary part of a linear electrical machine, comprising:
    a first means for production of a first magnetic field;
    a second means for production of a second magnetic field, wherein the first means and the second means are arranged to realize superimposition of the first magnetic field with the second magnetic field;
    a flux-guiding element arranged on at least one end face of the primary part to reduce a force ripple, said flux-guiding element being constructed in the form of an end tooth module having at least one permanent magnet; and
    a predefined number of primary tooth modules, wherein each primary tooth module has at least one permanent magnet, said permanent magnet of the end tooth module having a volume which is smaller than the permanent magnet of the primary tooth module.

2. The primary part of claim 1, wherein the first means is a single-phase winding.

3. The primary part of claim 1, wherein the first means is a polyphase winding.

4. The primary part of claim 1, wherein the second means is implemented in the form of permanent magnet material.

5. The primary part of claim 1, wherein the flux-guiding element includes one of the first means and the second means for production of a magnetic field.

6. A primary part of a linear electrical machine, comprising:
    a first means for production of a first magnetic field;
    a second means for production of a second magnetic field, wherein the first means and the second means are arranged to realize superimposition of the first magnetic field with the second magnetic field;
    a flux-guiding element arranged on at least one end face of the primary part to reduce a force ripple, said flux-guiding element being constructed in the form of an end tooth module having at least one permanent magnet; and
    a predefined number of primary tooth modules, wherein each primary tooth module has at least one permanent magnet and one tooth-wound coil,
    wherein the permanent magnets of the primary tooth modules have a magnetization which is higher than the magnetization of the end tooth module.

7. The primary part of claim 6, wherein the permanent magnet of the end tooth module and the permanent magnets of the primary tooth modules have a same magnetization.

8. The primary part of claim 6, wherein the permanent magnet of end tooth module and the permanent magnets of the primary tooth modules have a remanent induction.

9. The primary part of claim 6, wherein the first means is a single-phase winding.

10. The primary part of claim 6, wherein the first means is a polyphase winding.

11. The primary part of claim 6, wherein the second means is implemented in the form of permanent magnet material.

12. The primary part of claim 6, wherein the flux-guiding element includes one of the first means and the second means for production of a magnetic field.

13. A linear electrical machine, comprising:
a primary part including a first means for production of a first magnetic field, a second means for production of a second magnetic field, wherein the first means and the second means are arranged to superimpose the first magnetic field and the second magnetic field, and a flux-guiding element arranged on at least one end face of the primary part to reduce a force ripple, said flux-guiding element being constructed in the form of an end tooth module having at least one permanent magnet; and
a secondary part constructed absent a production of a magnetic field,
wherein the primary part includes a predefined number of primary tooth modules placed side-by-side in a longitudinal direction, each said primary tooth module having at least one permanent magnet, wherein the permanent magnet of the end tooth module has a volume which is smaller than the permanent magnet of the primary tooth module.

14. The linear electrical machine of claim 13, wherein the secondary part has a toothed iron structure with a plurality of teeth and slots.

15. The linear electrical machine of claim 13, constructed in the form of a synchronous linear motor.

16. A linear electrical machine, comprising:
a primary part including a first means for production of a first magnetic field, a second means for production of a second magnetic field, wherein the first means and the second means are arranged to superimpose the first magnetic field and the second magnetic field, and a flux-guiding element arranged on at least one end face of the primary part to reduce a force ripple, said flux-guiding element being constructed in the form of an end tooth module having at least one permanent magnet; and
a secondary part constructed absent a production of a magnetic field,
wherein the primary part includes a predefined number of primary tooth modules placed side-by-side in a longitudinal direction, each said primary tooth module having at least one permanent magnet, wherein the permanent magnets of the primary tooth modules have a magnetization which is higher than the magnetization of the end tooth module.

17. The linear electrical machine of claim 16, wherein the secondary part has a toothed iron structure with a plurality of teeth and slots.

18. The linear electrical machine of claim 16, constructed in the form of a synchronous linear motor.

* * * * *